US012288522B1

(12) United States Patent
Yang et al.

(10) Patent No.: US 12,288,522 B1
(45) Date of Patent: Apr. 29, 2025

(54) DISPLAYS HAVING REDUCED PIXEL DENSITY REGION WITH LOCALIZED TUNING

(71) Applicant: Apple Inc., Cupertino, CA (US)

(72) Inventors: Shyuan Yang, San Jose, CA (US); Salman Kabir, Santa Clara, CA (US); Ricardo A Peterson, Fremont, CA (US); Warren S Rieutort-Louis, Cupertino, CA (US); Ting-Kuo Chang, San Jose, CA (US); Qing Li, Cupertino, CA (US); Yuchi Che, Santa Clara, CA (US); Tsung-Ting Tsai, San Jose, CA (US); Feng Wen, Cupertino, CA (US); Abbas Jamshidi Roudbari, Saratoga, CA (US); Kyounghwan Kim, San Jose, CA (US); Graeme M Williams, San Diego, CA (US); Kingsuk Brahma, Mountain View, CA (US); Yue Jack Chu, Palo Alto, CA (US); Junbo Wu, Palo Alto, CA (US); Chieh-Wei Chen, Taichung (TW); Bo-Ren Wang, San Diego, CA (US); Injae Hwang, Santa Clara, CA (US); Wenbing Hu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/350,621

(22) Filed: Jul. 11, 2023

Related U.S. Application Data

(60) Provisional application No. 63/409,608, filed on Sep. 23, 2022.

(51) Int. Cl.
*G09G 3/3258* (2016.01)

(52) U.S. Cl.
CPC ... *G09G 3/3258* (2013.01); *G09G 2300/0452* (2013.01); *G09G 2300/0819* (2013.01);
(Continued)

(58) Field of Classification Search
CPC ......... G09G 3/3258; G09G 2300/0819; G09G 2300/0452; G09G 2300/0842;
(Continued)

(56) References Cited

U.S. PATENT DOCUMENTS 11,145,233 B1 * 10/2021 Dao .................... H04N 23/57
11,322,088 B2 5/2022 Matsueda et al.
(Continued)

FOREIGN PATENT DOCUMENTS

CN 111739921 A 10/2020
WO 2021147032 A1 7/2021

*Primary Examiner* — Kenneth B Lee, Jr.
(74) *Attorney, Agent, or Firm* — Treyz Law Group; Jason Tsai

(57) ABSTRACT

An electronic device includes a display and a sensor underneath the display. The display has a full pixel density region and a reduced pixel density region. Compared to pixels in the full pixel density region, pixels in the reduced pixel density region can be controlled using overdriven power supply voltages, overdriven scan control signals, different initialization and reset voltages, and can include capacitors and transistors with different physical and electrical characteristics. Gate drivers provide scan signals to pixels in the full pixel density region, whereas overdrive buffers provide overdrive scan signals to pixels in the reduced pixel density region. The pixels in the full pixel density region and the pixels in the reduced pixel density region can be controlled using different black level or gamma settings for each color channel and can be adjusted physically to match luminance, color, as well as to mitigate differences in temperature and aging impact.

25 Claims, 12 Drawing Sheets

(52) U.S. Cl.
CPC ............... *G09G 2300/0842* (2013.01); *G09G 2300/0861* (2013.01); *G09G 2310/0291* (2013.01); *G09G 2320/0233* (2013.01); *G09G 2320/0247* (2013.01); *G09G 2320/041* (2013.01); *G09G 2320/043* (2013.01); *G09G 2330/028* (2013.01)

(58) Field of Classification Search
CPC ... G09G 2300/0861; G09G 2310/0291; G09G 2320/0233; G09G 2320/0247; G09G 2320/041; G09G 2320/043; G09G 2330/028
See application file for complete search history.

(56) References Cited

U.S. PATENT DOCUMENTS

| | | | | |
|---|---|---|---|---|
| 11,495,176 | B1 * | 11/2022 | Hsieh | G09G 3/3266 |
| 11,823,620 | B1 * | 11/2023 | Wang | G09G 3/3225 |
| 2021/0287610 | A1 * | 9/2021 | Kim | G09G 3/3233 |
| 2022/0139317 | A1 | 5/2022 | Lee et al. | |
| 2022/0406257 | A1 * | 12/2022 | Gu | G09G 3/3291 |
| 2023/0120671 | A1 * | 4/2023 | Aogaki | G09G 3/006<br>345/204 |
| 2023/0165052 | A1 * | 5/2023 | Liu | H10K 59/131<br>257/40 |
| 2023/0178032 | A1 * | 6/2023 | Kim | G09G 3/007 |

* cited by examiner

| | Vblack |
|---|---|
| R SUBPIXELS IN FULL PIXEL DENSITY REGION | Vbr1 |
| G SUBPIXELS IN FULL PIXEL DENSITY REGION | Vbg1 |
| B SUBPIXELS IN FULL PIXEL DENSITY REGION | Vbb1 |
| R SUBPIXELS IN REDUCED PIXEL DENSITY REGION | Vbr2 |
| G SUBPIXELS IN REDUCED PIXEL DENSITY REGION | Vbg2 |
| B SUBPIXELS IN REDUCED PIXEL DENSITY REGION | Vbb2 |

*FIG. 16*

DISPLAYS HAVING REDUCED PIXEL DENSITY REGION WITH LOCALIZED TUNING

This application claims the benefit of U.S. Provisional Patent Application No. 63/409,608, filed Sep. 23, 2022, which is hereby incorporated by reference herein in its entirety.

BACKGROUND

This relates generally to electronic devices, and, more particularly, to electronic devices with displays.

Electronic devices often include displays. For example, an electronic device may have a light-emitting diode (LED) display based on light-emitting diode pixels. In this type of display, each pixel includes a light-emitting diode and circuitry for controlling application of a signal to the light-emitting diode to produce light.

There is a trend towards borderless electronic devices with a full-face display. These devices, however, may still need to include sensors such as cameras, ambient light sensors, and proximity sensors to provide other device capabilities. Since the display now covers the entire front face of the electronic device, the sensors will have to be placed under the display stack. It can be challenging to design sensors under the display stack. It is within this context that the embodiments herein arise.

SUMMARY

An electronic device may include a sensor and a display having a portion that overlaps the sensor. The portion of the display that overlaps with the sensor can be referred to as a localized sensor region. A portion of the display that is non-overlapping with the sensor may have a first pixel density, whereas the localized sensor region may have a second pixel density that is less than the first pixel density so that light transmittance to the sensor underneath is enhanced. The localized sensor region can therefore be referred to, relative to the remaining portion of the display, as a reduced pixel density region. The remaining portion of the display outside the reduced pixel density region can be referred to as a full pixel density region.

Pixels in the reduced pixel density region can be driven using voltages that are different than voltages being supplied to pixels in the full pixel density region. Relative to pixels in the full pixel density region, pixels in the reduced pixel density region can be driven using higher positive power supply voltages, overdriven (lower) ground power supply voltages, overdriven scan control signals, and/or overdriven (lower) initialization voltages. The higher positive power supply voltages can be provided to pixels in the reduced pixel density region via peripheral power supply routing lines or via routing lines traversing at least a portion of the full pixel density region. The overdriven scan control signals can be generated using overdrive buffer circuits that are disposed at the periphery of the display or disposed within the reduced pixel density region. If desired, the pixels within the reduced pixel density region can have different electrical and physical characteristics than the pixels in the full pixel density region. Pixels within the reduced pixel density region can have a different capacitor design or layout, can include semiconducting oxide transistors with different threshold voltages, and can have a drive transistor with a different subthreshold swing and/or threshold voltage.

The pixels in the full pixel density region and the pixels in the reduced pixel density region can be controlled using different black level or gamma settings for each color channel and can be adjusted physically to match luminance, color, as well as to mitigate differences in temperature and aging impact. Pixels in the reduced pixel density region can have a different contact (hole) density to tune the subthreshold swing, can have different capacitance to tune the black level of individual subpixels, can have different anode aperture ratios to tune each subpixel's sensitivity to temperature variations, and can have different anode reset voltages to tune the black level of individual subpixels.

BRIEF DESCRIPTION OF THE DRAWINGS

FIG. 16 is table showing how pixels in the active area and pixels in the reduced pixel density region can have different black voltage levels in accordance with some embodiments.

DETAILED DESCRIPTION

Figure 1:
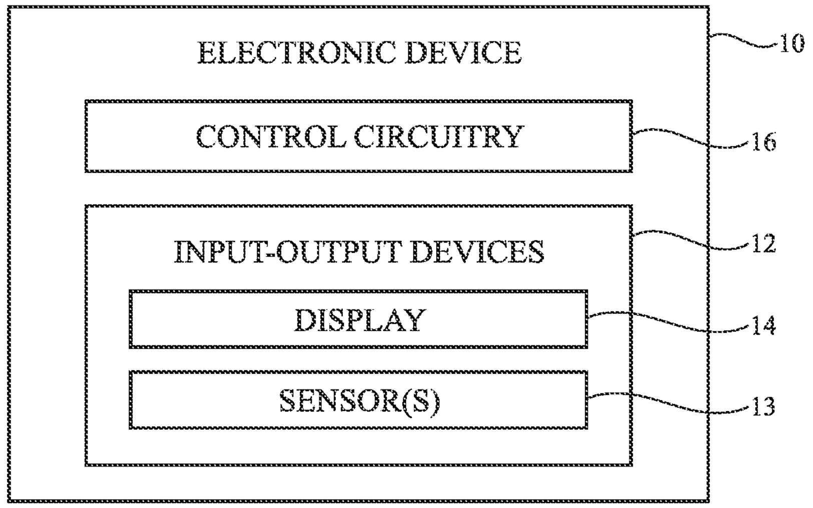
FIG. 1 is a schematic diagram of an illustrative electronic device having a display and one or more sensors in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a head-mounted device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include one or more sensors 13 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 13 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 13 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be an organic light-emitting diode display, a display formed from an array of discrete light-emitting diodes (microLEDs) each formed from a crystalline semiconductor die, or any other suitable type of display. Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
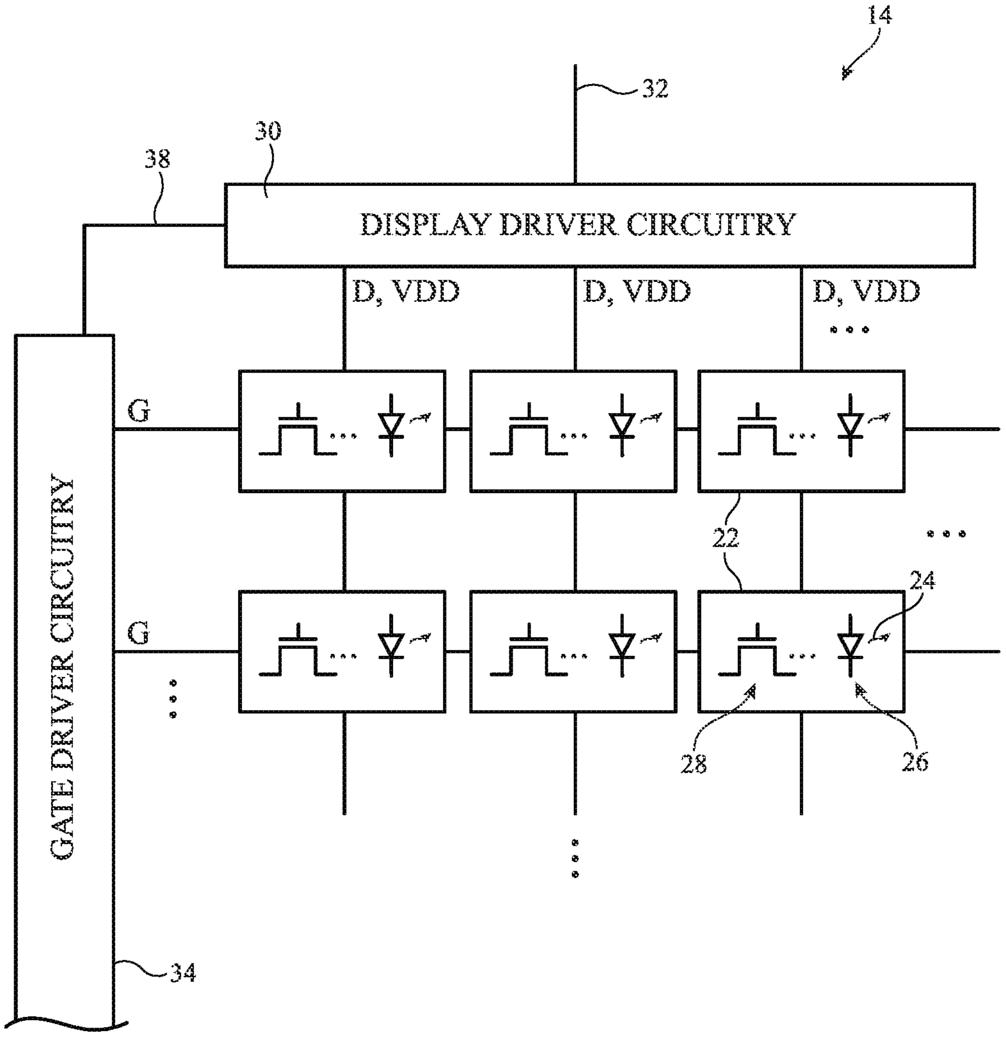
FIG. 2 is a schematic diagram of an illustrative display with light-emitting elements in accordance with some embodiments.

A top view of a portion of display 14 is shown in FIG. 2. As shown in FIG. 2, display 14 may have an array of pixels 22 formed on a substrate. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may include a light-emitting diode 26 that emits light 24 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductor material. Pixels 22 may contain light-emitting diodes of different colors (e.g., red, green, and blue) to provide display 14 with the ability to display color images or may be monochromatic pixels.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply display driver circuitry 30 with information on images to be displayed on display 14.

To display the images on display pixels 22, display driver circuitry 30 may supply image data to data lines D while issuing clock signals, pulse signals, and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 22 of each row. There may be any suitable number of horizontal control signals per row of pixels 22 (e.g., one or more row control signals, two or more row control signals, three or more row control signals, four or more row control signals, etc.).

The region on display 14 where the display pixels 22 are formed may sometimes be referred to herein as the active area. Electronic device 10 has an external housing with a peripheral edge. The region surrounding the active area and within the peripheral edge of device 10 is the border region. Images can only be displayed to a user of the device in the active area (region). It is generally desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Figure 3:
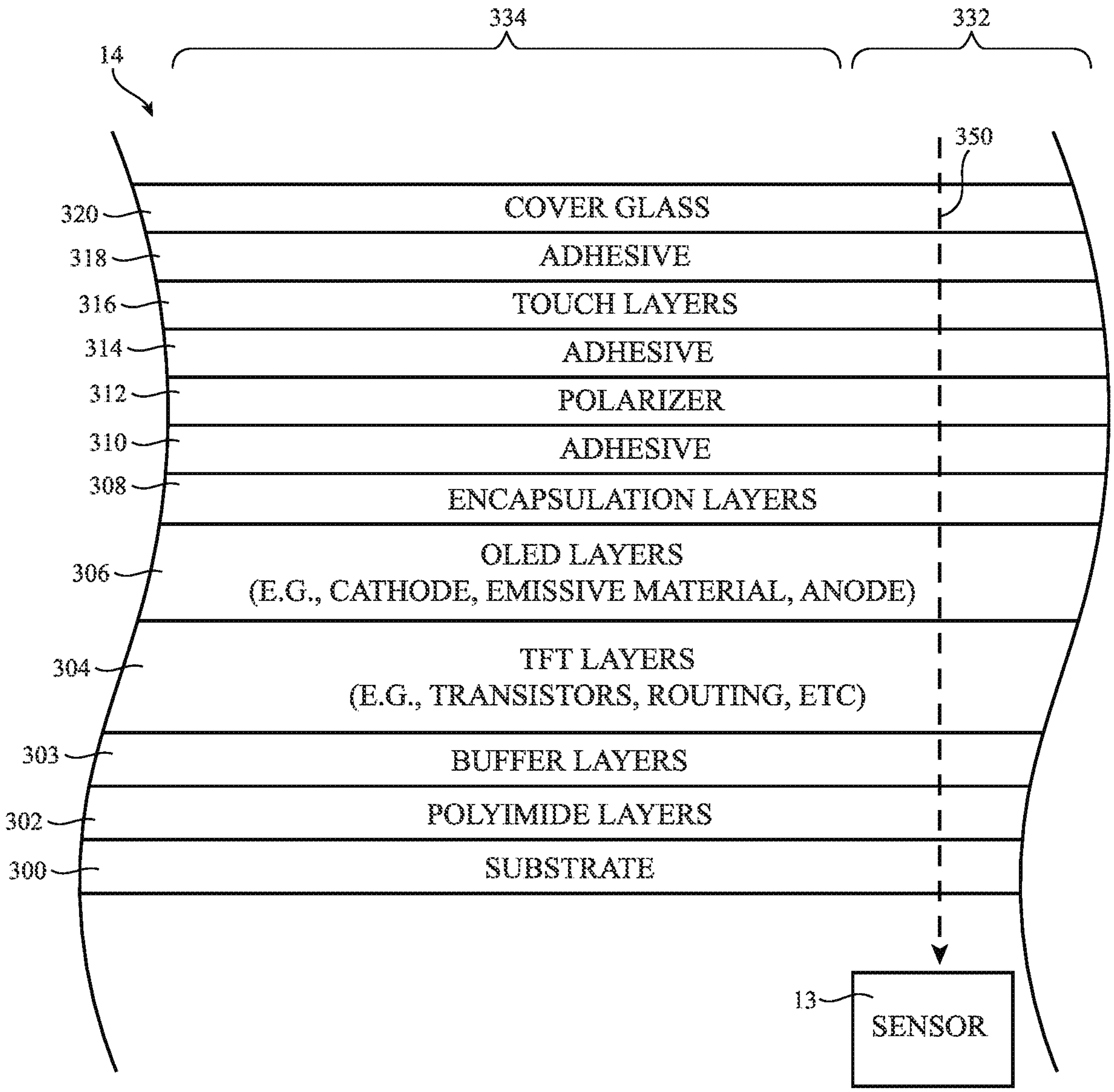
FIG. 3 is a cross-sectional side view of an illustrative display stack in accordance with some embodiments.

In accordance with some embodiments, device 10 may include a sensor 13 mounted behind display 14 (e.g., sensor 13 may be mounted underneath a display stack). FIG. 3 is a cross-sectional side view of an illustrative display stack of display 14 that at least partially covers sensor 13. As shown in FIG. 3, the display stack may include a substrate such as substrate 300. Substrate 300 may be formed from glass, metal, plastic, ceramic, sapphire, or other suitable substrate materials. In some arrangements, substrate 300 may be an organic substrate formed from polyethylene terephthalate (PET) or polyethylene naphthalate (PEN) (as examples). One or more polyimide (PI) layers 302 may be formed over substrate 300. The polyimide layers may sometimes be referred to as an organic substrate (e.g., substrate 300 is a first substrate layer and substrate 302 is a second substrate layer). The surface of substrate 302 may optionally be covered with one or more buffer layers 303 (e.g., inorganic buffer layers such as layers of silicon oxide, silicon nitride, amorphous silicon, etc.).

Thin-film transistor (TFT) layers 304 may be formed over inorganic buffer layers 303 and organic substrates 302 and 300. The TFT layers 304 may include thin-film transistor circuitry such as thin-film transistors, thin-film capacitors, associated routing circuitry, and other thin-film structures formed within multiple metal routing layers and dielectric layers. Organic light-emitting diode (OLED) layers 306 may be formed over the TFT layers 304. The OLED layers 306 may include a cathode layer, an anode layer, and emissive material interposed between the cathode and anode layers. The OLED layers may include a pixel definition layer that defines the light-emitting area of each pixel. The TFT circuitry in layer 304 may be used to control an array of display pixels formed by the OLED layers 306.

Circuitry formed in the TFT layers 304 and the OLED layers 306 may be protected by encapsulation layers 308. As an example, encapsulation layers 308 may include a first inorganic encapsulation layer, an organic encapsulation layer formed on the first inorganic encapsulation layer, and a second inorganic encapsulation layer formed on the organic encapsulation layer. Encapsulation layers 308 formed in this way can help prevent moisture and other potential contaminants from damaging the conductive circuitry that is covered by layers 308. Substrate 300, polyimide layers 302, buffer layers 303, TFT layers 304, OLED layers 306, and encapsulation layers 308 may be collectively referred to as a display panel.

One or more polarizer films 312 may be formed over the encapsulation layers 308 using adhesive 310. Adhesive 310 may be implemented using optically clear adhesive (OCA) material that offer high light transmittance. One or more touch layers 316 that implement the touch sensor functions of touch-screen display 14 may be formed over polarizer films 312 using adhesive 314 (e.g., OCA material). For example, touch layers 316 may include horizontal touch sensor electrodes and vertical touch sensor electrodes collectively forming an array of capacitive touch sensor electrodes. Lastly, the display stack may be topped off with a cover glass layer 320 (sometimes referred to as a display cover layer 320) that is formed over the touch layers 316 using additional adhesive 318 (e.g., OCA material). Display cover layer 320 may be a transparent layer (e.g., transparent plastic or glass) that serves as an outer protective layer for display 14. The outer surface of display cover layer 320 may form an exterior surface of the display and the electronic device that includes the display. If desired, polarizer 312 may be omitted from the display stack.

The example in FIG. 3 of the display stack including OLED layers is merely illustrative. As previously noted, the display stack may include pixels formed using other display technology. For example, the display stack may include an array of discrete light-emitting diodes each formed from a crystalline semiconductor die (e.g., an array of microLEDs).

Still referring to FIG. 3, sensor 13 may be formed under the display stack within the electronic device 10. As described above in connection with FIG. 1, sensor 13 may be an optical sensor such as a camera, proximity sensor, ambient light sensor, fingerprint sensor, or other light-based sensor. In some cases, sensor 13 may include a light-emitting component that emits light through the display. Sensor 13 may therefore sometimes be referred to as input-output component 13. Input-output component 13 may be a sensor or a light-emitting component (e.g., that is part of a sensor). The performance of input-output component 13 depends on the transmission of light traversing through the display stack, as indicated by arrow 350. A typical display stack, however, has fairly limited transmission properties. For instance, more than 80% of light in the visible and infrared light spectrum might be lost when traveling through the display stack, which makes sensing under display 14 challenging.

Each of the multitude of layers in the display stack contributes to the degraded light transmission to sensor 13. In particular, the dense thin-film transistors and associated routing structures in TFT layers 304 of the display stack contribute substantially to the low transmission. In accordance with some embodiments, at least some of the display pixels may be selectively removed in regions of the display stack located directly over sensor(s) 13. Regions of display 14 that at least partially cover or overlap with sensor(s) 13 in which at least a portion of the display pixels have been removed are sometimes referred to and defined as pixel removal regions, low density pixel regions, or reduced pixel density regions (see, e.g., region 332 overlapping sensor 13 in FIG. 3). Reduced pixel density region 332 that overlap with sensor 13 can also sometimes be referred to as a localized sensor region within the display active area. The remaining portion of the display active area outside of or surrounding reduced pixel density region 332 that is non-overlapping with sensor 13 can be referred to or defined as the full pixel density region 334. As their name suggests, full pixel density region 334 exhibits a nominal pixel density where all subpixels are present for maximum luminance and density, whereas reduced pixel density region 332 exhibits a relatively lower pixel density.

Reducing the density of pixel structures within reduced pixel density region 332 (e.g., by removing transistors and/or capacitors associated with one or more sub-pixels) can drastically help increase transmission and improve the performance of the under-display sensor 13. In addition to removing display subpixel structures, portions of additional layers such as polyimide layers 302 and/or substrate 300 may be removed for additional transmission improvement. Polarizer 312 may also be bleached for additional transmission improvement. It should be noted that the display stack (as in FIG. 3) may include a black masking layer to mitigate undesired reflections off the display stack. One or more black masking layers may be incorporated at any desired location within the display stack. A black masking layer may be incorporated above one or more of OLED layers 306, encapsulation layers 308, polarizer 312, etc.

Figure 4:
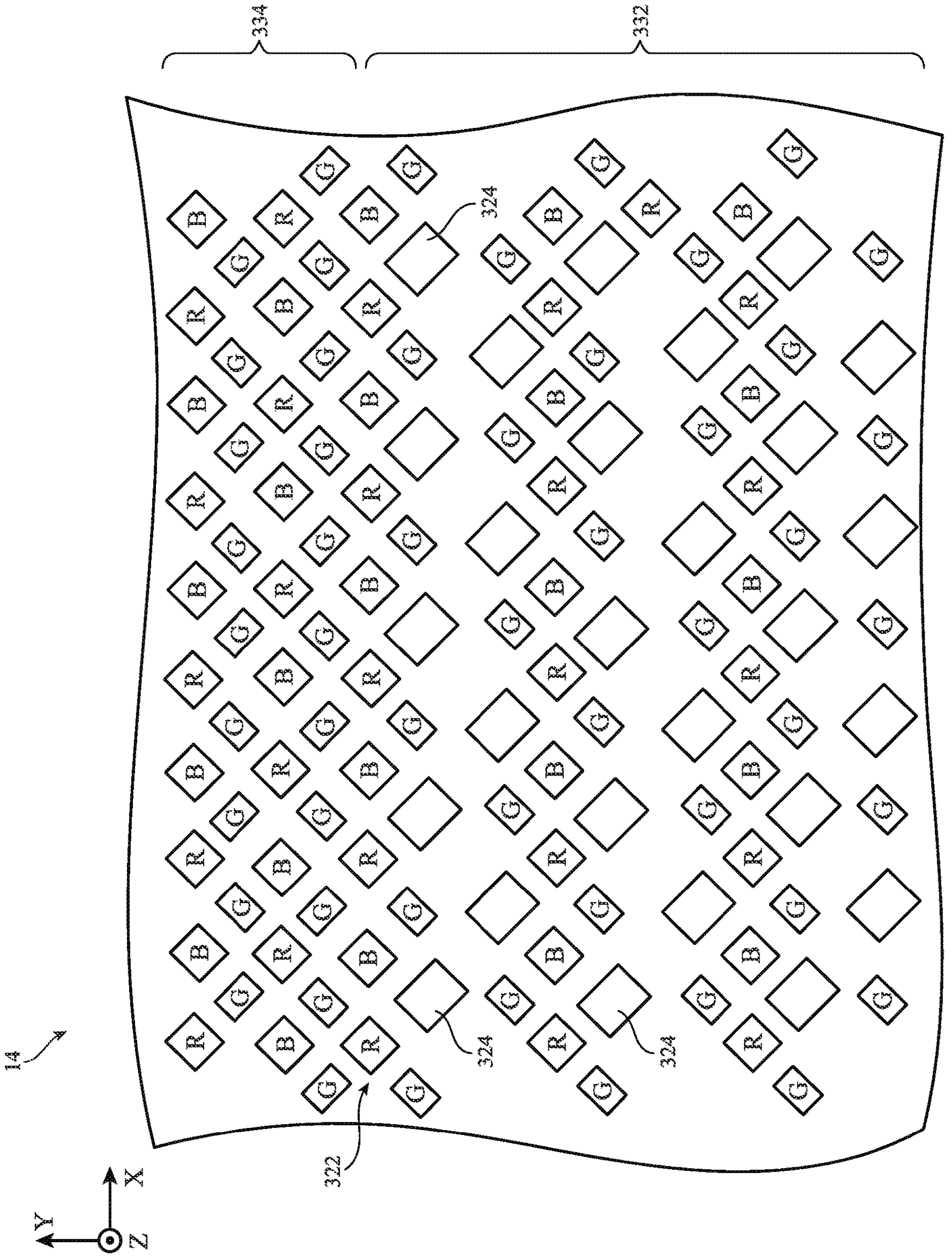
FIG. 4 is a top (plan) view of an illustrative display with transparent openings that overlap a sensor in accordance with some embodiments.

FIG. 4 is a top view of an illustrative display 14 showing how high-transmittance areas may be incorporated into a reduced pixel density region 332 of the display. As shown in FIG. 4, display 14 may include a plurality of pixels such as a plurality of red pixels (R), a plurality of blue pixels (B), and a plurality of green pixels (G). The red, blue, and green pixels may be arranged in any desired pattern. Different nomenclature may be used to refer to the red, green, and blue pixels in the display. As one option, the red, blue, and green pixels may be referred to simply as pixels. As another option, the red, blue, and green pixels may instead be referred to as red, blue, and green sub-pixels. In this example, a group of sub-pixels of different colors may be referred to as pixel. In high-transmittance areas 324, no sub-pixels are included in the display (even though sub-pixels would normally be present if the normal sub-pixel pattern was followed).

No pixels are removed from full pixel density region 334. Pixels are removed in pixel reduced pixel density region 332 relative to full pixel density region 334. To provide a uniform distribution of sub-pixels across the display surface, an intelligent pixel removal process may be implemented for region 332 that systematically eliminates the closest sub-pixel of the same color (e.g., the nearest neighbor of the same color may be removed). The pixel removal process may involve, for each color, selecting a given sub-pixel, identifying the closest or nearest neighboring sub-pixels of the same color (in terms of distance from the selected sub-pixel), and then eliminating/omitting those identified sub-pixels in the final reduced pixel density region. With this type of arrangement, there may be high-transmittance areas 324 in region 332, allowing a sensor or light-emitting component to operate through the display in the pixel removal region. Additionally, because some of the pixels remain present in the pixel removal region (e.g., 50% of the pixels in the layout of FIG. 4), reduced pixel density region 332 may not have a perceptibly different appearance from the rest of the display for a viewer.

As shown in FIG. 4, display 14 may include an array of high-transmittance areas 324 in reduced pixel density region 332. Each high-transmittance area 324 may have pixels removed in that area. Each high-transmittance area also has an increased transparency compared to pixel regions 322. The high-transmittance areas 324 may sometimes be referred to as transparent windows 324, transparent display windows 324, transparent openings 324, transparent display openings 324, transparent regions, etc. The transparent display windows 324 may allow for light to be transmitted through the display to an underlying sensor or for light to be transmitted through the display from a light source underneath the display. The transparency of transparent openings 324 (for ultraviolet, visible, and/or infrared light) may be greater than 25%, greater than 30%, greater than 40%, greater than 50%, greater than 60%, greater than 70%, greater than 80%, greater than 90%, etc. The transparency of transparent openings 324 may be greater than the transparency of pixel region 322. The transparency of pixel region 322 may be less than 25%, less than 20%, less than 10%, less than 5%, etc. The pixel region 322 may sometimes be referred to as opaque display region 322, opaque region 322, opaque footprint 322, etc. Opaque region 322 includes light emitting pixels R, G, and B, and blocks light from passing through the display stack.

The pattern of pixels (322) and high-transmittance areas (324) in FIG. 4 is merely illustrative. In FIG. 4, discrete high-transmittance areas 324 are depicted. However, it should be understood that these high-transmittance areas may form larger, unitary transparent openings if desired. The pattern of sub-pixels and pixel removal regions in FIG. 4 is merely illustrative. In FIG. 4, the display edge may be parallel to the X axis or the Y axis. The front face of the display may be parallel to the XY plane such that a user of the device views the front face of the display in the Z direction. In FIG. 4, every other sub-pixel may be removed for each color within pixel reduced pixel density region 332. The resulting pixel configuration has 50% of the sub-pixels removed. In FIG. 4, the remaining pixels in region 332 follow a zig-zag pattern across the display (with two green sub-pixels for every one red or blue sub-pixel). In FIG. 4, the sub-pixels have edges angled relative to the edges of the display (e.g., the edges of the sub-pixels are at non-zero, non-orthogonal angles relative to the X-axis and Y-axis). This example is merely illustrative. If desired, each individual sub-pixel may have edges parallel to the display edge, a different proportion of pixels may be removed for different colors, the remaining pixels may follow a different pattern, etc.

The example in FIG. 4 of pixels being removed in region 332 is merely illustrative. Alternatively, the size of the pixels in region 332 may be decreased relative to region 334 to increase the transparency in region 332 relative to region 334. Region 332 may therefore sometimes be referred to as high-transparency region 332, increased transparency region 332, or modified region 332 instead of pixel removal region or reduced pixel density region 332. There may be at least one modification to region 332 relative to region 334 (e.g., cathode removal, pixel removal, pixel shrinkage, etc.) that increases transparency through the display. In other embodiments, the size of at least some of the pixels (or subpixels) in reduced pixel density region 332 can be increased relative to the pixels (or subpixels) in full pixel density region 334. As an example, the red subpixels in region 332 might be at least two times larger than the red subpixels in region 334. As another example, the blue subpixels in region 332 might be at least two times larger than the blue subpixels in region 334. This is merely illustrative. The size of one or more subpixels in region 332 can be at least 1.1× larger, 1.2× larger, 1.1-1.5× larger, 1.5-2× larger, more than 2× larger, or more than 3× larger than the subpixels in region 334. Increasing the size of at least some of the subpixels in region 332 can help ensure that the pixel current density in region 332 will be similar to or matched with the pixel current density in region 334 while maintaining pixel density. Matching the pixel current density between regions 332 and 334 can help mitigate any temperature and aging differences over time between the two regions.

Figure 5A:
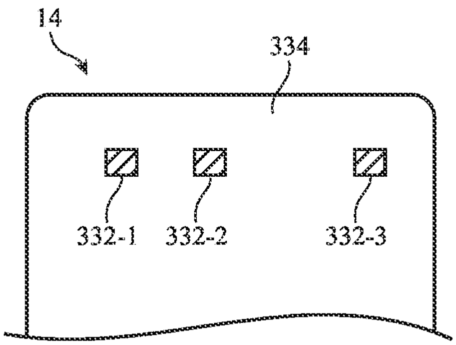
FIGS. 5A-5F are top views of illustrative displays showing possible positions for reduced pixel density regions in accordance with some embodiments.

In general, reduced pixel density region 332 having pixel structures selectively removed can be formed in one or more regions of the display. FIGS. 5A-5F are front views showing how display 14 may have one or more localized reduced pixel density regions. The example of FIG. 5A illustrates various local reduced pixel density regions 332 (sometimes referred to as low pixel density regions) physically separated from one another (i.e., the various pixel removal regions 332 are non-continuous) by full pixel density region 334. The full pixel density region 334 (sometimes referred to as full pixel density area 334) does not include any transparent windows 324 (e.g., none of the sub-pixels are removed and the display follows the regular pixel pattern without modifications). The full pixel density region 334 has a higher pixel density (pixels per unit area) than reduced pixel density regions 332. The three reduced pixel density regions 332-1, 332-2, and 332-3 in FIG. 5A might for example correspond to three different sensors formed underneath display 14 (with one sensor per reduced pixel density region).

Figure 5B:
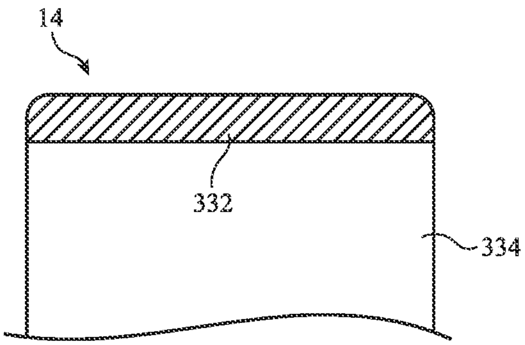
Figure 5C:
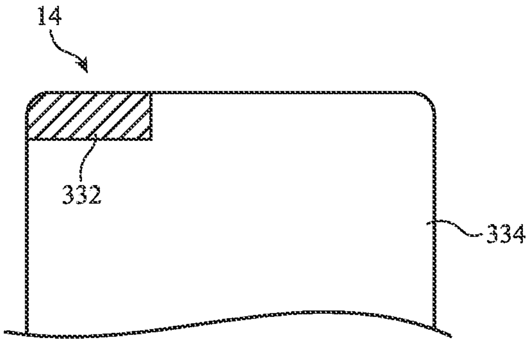
Figure 5D:
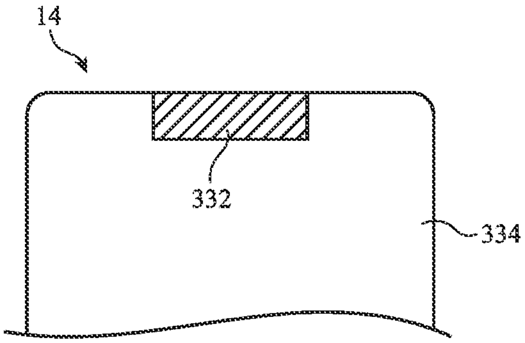
Figure 5E:
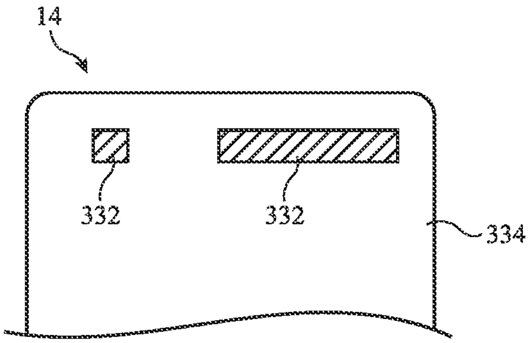
Figure 5F:
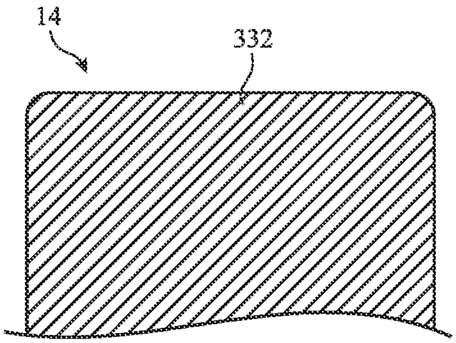

The example of FIG. 5B illustrates a continuous pixel removal region 332 formed along the top border of display 14, which might be suitable when there are many optical sensors positioned near the top edge of device 10. The example of FIG. 5C illustrates a reduced pixel density 332 formed at a corner of display 14 (e.g., a rounded corner area of the display). In some arrangements, the corner of display 14 in which reduced pixel density region 332 is located may be a rounded corner (as in FIG. 5C) or a corner having straight edges (e.g., a corner where two edges join at a 90° angle). The example of FIG. 5D illustrates a reduced pixel density region 332 formed only in the center portion along the top edge of device 10 (i.e., the reduced pixel density region covering a recessed notch area in the display). FIG. 5E illustrates another example in which reduced pixel density regions 332 can have different shapes and sizes. FIG. 5F illustrates yet another suitable example in which the reduced pixel density region covers the entire display surface. These examples are merely illustrative and are not intended to limit the scope of the present embodiments. If desired, any one or more portions of the display overlapping with optically based sensors or other sub-display electrical components may be designated as a reduced pixel density region/area. Full pixel density region 334 may at least partially surround (or in some cases completely surround) or border each reduced pixel density region 332.

Referring back to FIG. 4, full pixel density region 334 has a higher pixel density and thus more pixels per unit surface area, whereas reduced pixel density region 332 has a lower pixel density and thus fewer pixels per unit surface area. If care is not taken, the luminance of pixels formed within full pixel density region 334 might be greater than the luminance of pixels formed within reduced pixel density region 332. Thus, in accordance with some embodiments, various techniques are provided to ensure luminance uniformity between regions 332 and 334. For example, one way of boosting the luminance of the reduced pixel density region 332 would be to selectively increase the drive current flowing through the pixels within region 332. For instance, in a scenario where the reduced pixel density region 332 has only half the pixel density of the full pixel density region 334, then it may be desirable to double the drive current of the pixels in region 332 to achieve the same brightness/luminance levels. As another example, if the reduced pixel density region 332 has only a quarter of the pixel density of the full pixel density region 334, then it may be desirable to quadruple the drive current of the pixels in region 332 to achieve uniform brightness/luminance across the display.

Figure 6:
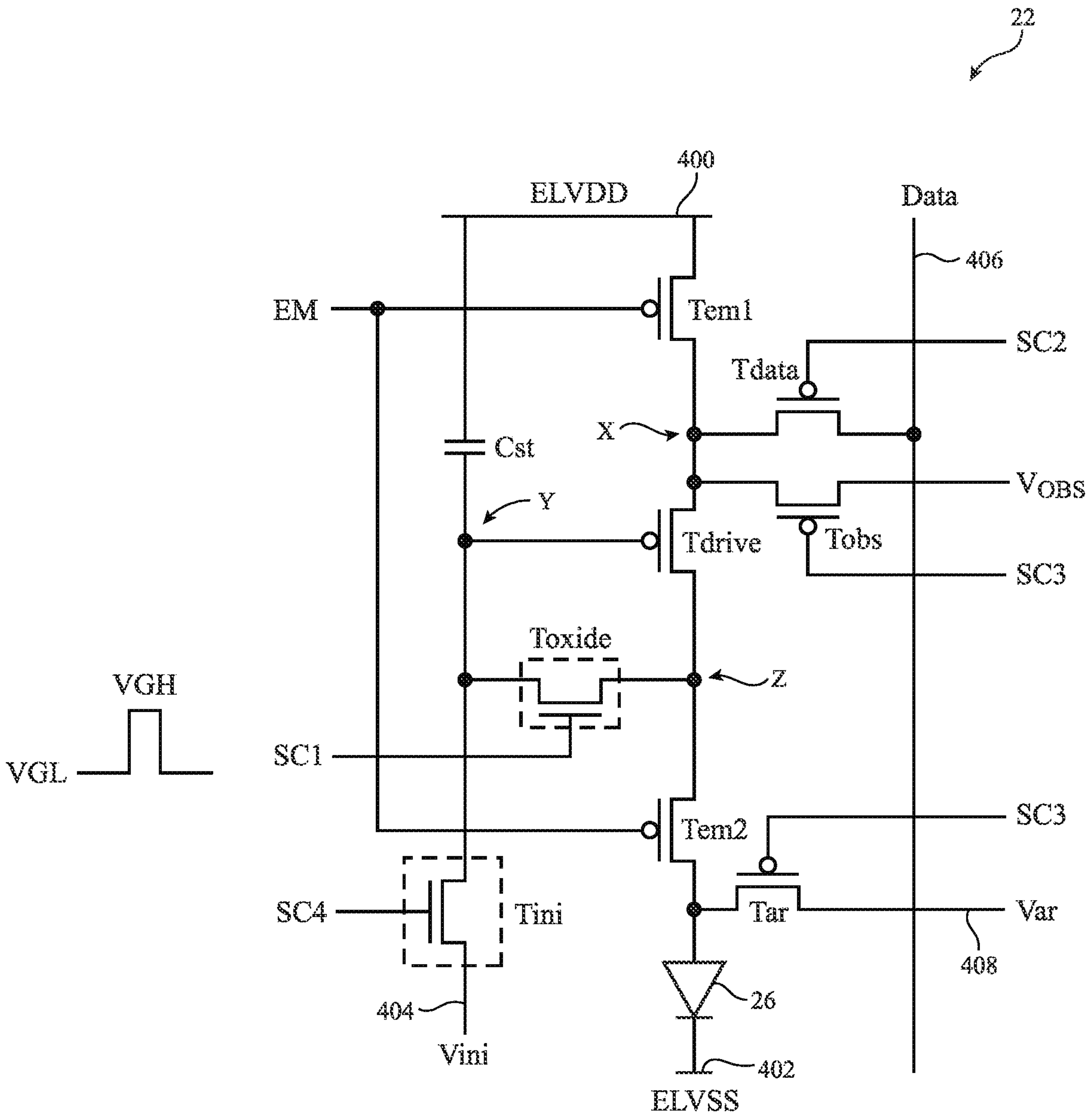
FIG. 6 is a circuit diagram of an illustrative display pixel that can be formed in a full pixel density region that is non-overlapping with a sensor in accordance with some embodiments.

FIG. 6 is a circuit diagram of an illustrative display pixel 22 that can be formed in a full pixel density region 334. As shown in FIG. 6, display pixel 22 may include a storage capacitor Cst, n-type (i.e., n-channel) transistors such as semiconducting-oxide transistors Toxide and Tini, and p-type (i.e., p-channel) transistors such as a drive transistor Tdrive, a data loading transistor Tdata, a first emission transistor Tem1, a second emission transistor Tem2, an anode reset transistor Tar, and a biasing transistor Tobs. While transistors Toxide and Tini are formed using semiconducting oxide (e.g., transistors having channel regions formed from semiconducting oxide such as indium gallium zinc oxide or IGZO), the other p-channel transistors may be thin-film transistors formed from a semiconductor such as silicon (e.g., polysilicon channel deposited using a low temperature process, sometimes referred to as LTPS or low-temperature polysilicon). Semiconducting-oxide transistors exhibit relatively lower leakage than silicon transistors, so implementing transistors Toxide and Tini as semiconducting-oxide transistors will help reduce flicker (e.g., by preventing current from leaking away from the gate terminal of drive transistor Tdrive).

In another suitable arrangement, transistors Toxide, Tini, and Tdrive may be implemented as semiconducting-oxide transistors while the remaining transistors Tdata, Tem1, Tem2, Tar, and Tobs are LTPS transistors. Transistor Tdrive serves as the drive transistor and has a threshold voltage that is critical to the emission current of pixel 22. Since the threshold voltage of transistor Tdrive may experience hysteresis, forming the drive transistor as a top-gate semiconducting-oxide transistor can help reduce the hysteresis (e.g., a top-gate IGZO transistor experiences less Vth hysteresis than a silicon transistor). If desired, any of the remaining transistors Tdata, Tem1, Tem2, Tar, and Tobs may be implemented as semiconducting-oxide transistors. Moreover, any one or more of the p-channel transistors may be n-type (i.e., n-channel) thin-film transistors. If desired, all of the transistors within pixel 22 can be formed as semiconducting oxide transistors.

Display pixel 22 may include an organic light-emitting diode (OLED) 26. A positive power supply voltage ELVDD may be supplied to positive power supply terminal 400, and a ground power supply voltage ELVSS may be supplied to ground power supply terminal 402. Positive power supply voltage ELVDDEL may be 3 V, 4 V, 5 V, 6 V, 7 V, 2 to 8 V, more than 8 V, or any suitable positive power supply voltage level. Ground power supply voltage ELVSS may be 0 V, −1 V, −2 V, −3 V, −4 V, −5 V, −6V, −7 V, less than −7 V, or any suitable ground or negative power supply voltage level. The state of drive transistor Tdrive controls the amount of current flowing from terminal 400 to terminal 402 through diode 26, and therefore the amount of emitted light from display pixel 22. Light-emitting diode 26 may have an associated parasitic capacitance COLED (not shown).

Gate driver circuitry 34 of FIG. 2 can be used to supply row control signals such as an emission control signal EM and scan control signals (e.g., scan signals SC1, SC2, SC3, and SC4) via corresponding row (gate) lines. Data line 406 can supply a data signal for loading a data voltage onto pixel 22 during a data programming phase. Control signals EM, SC2, and SC3 for modulating the p-type silicon transistors can be driven low to turn on those transistors (since p-type transistors are "active-low" devices) and driven high to turn them on. Control signals EM, SC2, and SC3, when asserted, may generally be driven to a voltage level that is lower than ELVSS (e.g., to overdrive the corresponding transistors). As an example, if ELVSS is equal to −7 V, signals EM, SC2, and SC3 might be driven to −9 V when asserted. Control signals EM, SC2, and SC3, when deasserted, may generally be driven to a voltage level that is higher than ELVDD (e.g., to further deactivate the corresponding transistors to help minimize leakage). As an example, if ELVDD is equal to 7 V, signals EM, SC2, and SC3 might be driven to 9 V when deasserted.

Control signals SC1 and SC4 for modulating the n-type semiconducting-oxide transistors Toxide and Tini can be driven high to turn on transistors Toxide and Tini (since n-type transistors are "active-high" devices) and driven low to turn off these transistors. Since SC1 independently controls transistor Toxide, the high and low levels of SC1 can be adjusted to enhance oxide TFT driving capability. Similarly, since SC4 independently controls transistor Tini, the high and low levels of SC4 can be adjusted to enhance the driving capability of Tini. Control signals SC1 and SC4, when asserted, may generally be driven to a voltage level that is higher than ELVDD to overdrive transistors Toxide and Tini, respectively. As an example, if ELVDD is equal to 5 V, scan signals SC1 and SC4 might be driven to 8 V when asserted. Conversely, control signal SC1 and SC4, when deasserted, may generally be driven to a voltage level that is lower than ELVSS to minimize leakage through transistors Toxide and Tini, respectively. As an example, if ELVSS is equal to −5 V, signals SC1 and SC4 might be driven to −8 V when deasserted. The disclosed high and low voltage levels for each of these row control signals are merely illustrative and can be adjusted to other suitable voltage levels to support the desired mode of operation.

In the example of FIG. 6, transistors Tem1, Tdrive, Tem2, and diode 26 may be coupled in series between power supply terminals 400 and 402. In particular, first emission transistor Tem1 may have a source terminal that is coupled to positive power supply terminal 400, a gate terminal that receives emission control signal EM, and a drain terminal connected to node X. The terms "source" and "drain" are sometimes used interchangeably when referring to current-conducting terminals of a metal-oxide-semiconductor transistor. The source and drain terminals are therefore sometimes referred to as "source-drain" terminals (e.g., a transistor has a gate terminal, a first source-drain terminal, and a second source-drain terminal).

Drive transistor Tdrive may have a source terminal coupled to node X, a gate terminal connected to node Y, and a drain terminal connected to node Z. Second emission control transistor Tem2 may have a source terminal coupled to node Z, a gate terminal that also receives emission control signal EM, and a drain terminal coupled to an anode terminal of light-emitting diode 26. Configured in this way, emission control signal EM can be asserted (e.g., driven low or temporarily pulsed low) to turn on transistors Tem1 and Tem2 during an emission phase to allow current to flow through light-emitting diode 26.

Storage capacitor Cst may have a first terminal that is coupled to positive power supply line 400 and a second terminal that is coupled to node Y. Image data that is loaded into pixel 22 can be at least partially stored on pixel 22 by using capacitor Cst to hold charge throughout the emission phase. Transistor Toxide may have a first source-drain terminal coupled to node Y, a second source-drain terminal coupled to node Z, and a gate terminal configured to receive scan control signal SC1. Signal SC1 may be asserted (e.g., driven high or temporarily pulsed high) to turn on n-type transistor Toxide to short the drain and gate terminals of transistor Tdrive. A transistor configuration where the gate and drain terminals are shorted is sometimes referred to as being "diode-connected." Transistor Toxide is therefore sometimes referred to as a diode-connection transistor or a gate-to-drain transistor.

Initialization transistor Tini (e.g., a semiconducting oxide transistor) may have a first source-drain terminal coupled to node Y, a second source-drain terminal coupled to an initialization line 404 (e.g., a control line on which initialization voltage Vini is provided), and a gate terminal configured to receive scan control signal SC4. Scan signal SC4 can be asserted (e.g., driven high) to turn on initialization transistor Tini and can be deasserted (e.g., driven low) to turn off Tini. Initialization voltage Vini may be a negative voltage such as −1 V, −2 V, −3 V, −4V, −5 V, −6 V, −7 V, less than −7 V, less than ELVSS, greater than ELVSS, equal to ELVSS, or other suitable initializing voltage to assist in turning off the drive transistor during an initialization phase.

Anode reset transistor Tar may have a first source-drain terminal coupled to the anode terminal of diode 26, a second source-drain terminal coupled to a reset line 408 (e.g., a control line on which anode reset voltage Var is provided), and a gate terminal configured to receive scan control signal SC3. Scan signal SC3 can be asserted (e.g., driven low) to turn on anode reset transistor Tar and can be deasserted (e.g., driven high) to turn off Tar. Initialization voltage Var may be a negative voltage such as −1 V, −2 V, −3 V, −4V, −5 V, −6 V, −7 V, less than −7 V, less then ELVSS, greater than ELVSS, equal to ELVSS, or other suitable resetting voltage to ensure that light-emitting diode 26 is turned off during a reset/initialization phase.

Data loading transistor Tdata may have a first source-drain terminal coupled to node X, a second source-drain terminal coupled to data line 406 (e.g., a control line on which a data voltage is provided), and a gate terminal configured to receive scan control signal SC2. Scan signal SC2 can be asserted (e.g., driven low) to turn on data loading transistor Tdata for loading the data voltage into pixel 22 during a data programming phase and can be deasserted (e.g., driven high) to turn off Tdata.

Display pixel 22 of FIG. 6 can support in-pixel threshold voltage compensation/cancellation. Display pixels in display 14 can include thin-film transistors that are subject to threshold voltage variation. Variations in transistor threshold voltages (Vth) can result in non-uniformity in pixel-to-pixel luminance across an array of display pixels. To provide a high contrast ratio while ensuring sufficient pixel-to-pixel luminance uniformity, in-pixel (internal) threshold voltage compensation techniques can be employed to sample the threshold voltage of transistor Tdrive during a threshold voltage sampling phase, where the sampled threshold voltage is subsequently canceled out during the emission phase such that the emission current is independent of the drive transistor threshold voltage. For example, operation of display pixel 22 may involve a reset/initialization phase, a threshold voltage sampling (compensation) phase, a data programming phase, and an emission phase. If desired, some of these phases can be combined such that the operations of two different phases are performed simultaneously. The duration of these phases can also be tuned to optimize the performance of the overall display.

In certain situations, threshold voltage Vth can shift, such as when display 14 is transitioning from a black image to a white image or when transitioning from one gray level to another. This shifting in Vth (sometimes referred to herein as thin-film transistor "hysteresis") can cause a reduction in luminance, which is otherwise known as "first frame dimming." For example, the saturation current Ids waveform as a function of Vgs of the drive transistor for a black frame might be slightly offset from the target Ids waveform as a function of Vgs of the drive transistor for a white frame. Without performing an on-bias stress phase, the sampled Vth will correspond to the black frame and will therefore deviate from the target Ids waveform by quite a large margin. By performing an additional on-bias stress phase, the sampled Vth will correspond to the desired data voltage and will therefore be much closer to the target Ids curve. Performing the on-bias stress phase to bias the Vsg of the drive transistor with the desired data voltage before sampling Vth can therefore help mitigate hysteresis and improve first frame response. An on-bias stress phase may therefore be defined as an operation that applies a suitable bias voltage directly to the drive transistor during non-emission phases (e.g., such as by turning on the data loading transistor or the initialization transistor).

Transistor Tobs may be included in pixel 22 to provide on-bias stress during the on-bias stress phase. Biasing transistor Tobs may have a first source-drain terminal coupled to node X, a second source-drain terminal coupled to on-bias stress voltage Vobs, and a gate terminal configured to receive scan control signal SC3. Scan signal SC3 can be asserted (e.g., driven low) to turn on transistor Tobs for applying a suitable on-bias stress voltage Vobs to the source node of the drive transistor such that the subsequently sampled Vth of the drive transistor can correspond as close to the desired data voltage as possible and can be deasserted (e.g., driven high) to turn off Tobs.

The structure of display pixel 22 of FIG. 6 is merely illustrative and is not intended to limit the scope of the present embodiments. If desired, pixel 22 can have more than eight transistors or fewer than eight transistors. If desired, pixel 22 can have two or more capacitors. If desired, pixel 22 can be formed using only semiconducting oxide transistor (without any silicon transistors). If desired, the various transistors in pixel 22 can be connected in other ways (e.g., the data loading transistor Tdata can instead be connected at the gate node or the drain node of the drive transistor, the on-bias stress transistor Tobs can instead be connected at the drain terminal of Tdrive, the anode reset transistor can instead be connected at the drain terminal of Tdrive, etc.). If desired, pixel 22 may be controlled using more than four scan control signals or fewer than four scan control signals (e.g., using only three scan signals for each row of pixels, using only two scan signals for each row of pixels, etc.). If desired, pixel 22 may be controlled using two or more emission control signals (e.g., transistor Tem1 may be controlled using a first emission signal, whereas transistor Tem2 may be controlled using a second emission control signal). If desired, pixel 22 might include only one emission transistor (e.g., transistor Tem1 can be omitted, or transistor Tem2 can be omitted). If desired, any n-type transistor can be replaced by a p-type transistor, and vice versa.

Figure 7:
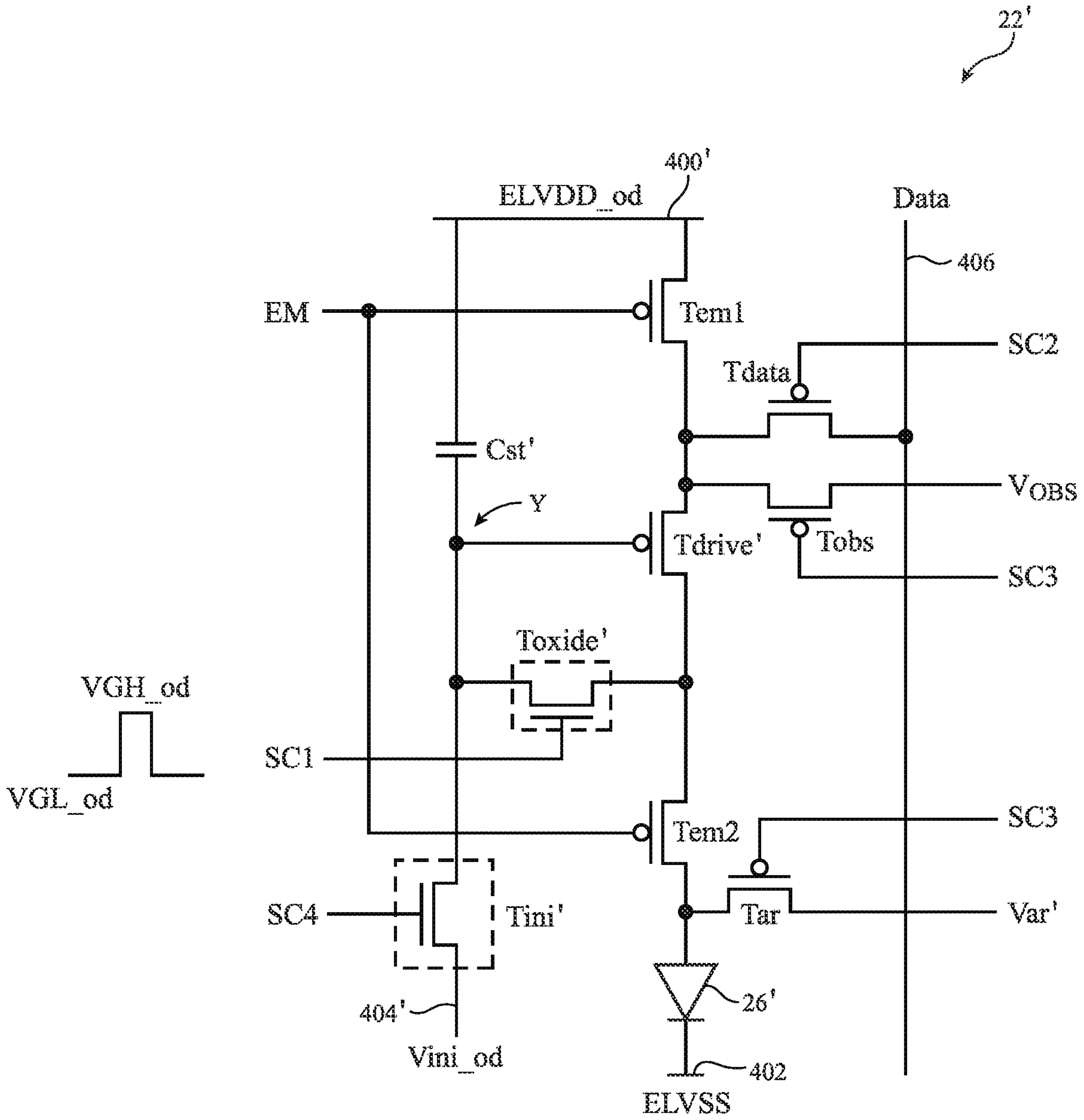
FIG. 7 is a circuit diagram of an illustrative display pixel that can be formed in a reduced pixel density region overlapping with a sensor in accordance with some embodiments.

The display pixel 22 shown in FIG. 6 can be formed in full pixel density region 334. As described above, pixels formed within the reduced pixel density region 332 will need higher driving current to ensure that the luminance between regions 332 and 334 is matched. FIG. 7 is a circuit diagram of a display pixel 22' that can be formed in reduced pixel density region 332. As shown in FIG. 7, pixel 22' may include a light-emitting diode 26', a storage capacitor Cst', and thin-film transistors such as drive transistor Tdrive', emission transistors Tem1 and Tem2, semiconducting oxide transistor Toxide', initialization transistor Tini', anode reset transistor Tar, data loading transistor Tdata, and on-bias stress transistor Tobs. The overall structure of pixel 22' is similar to pixel 22 of FIG. 6 and need not be reiterated in detail to avoid obscuring the present embodiment.

One way to increase the drive current of pixel 22' is to locally tune the voltages that are supplied to the pixels within the reduced pixel density region 332. As an example, the positive power supply voltage of pixel 22' can be overdriven to a higher voltage relative to the power supply voltage of pixel 22. The term "overdrive" or "overdriven," when applied to a positive voltage generally refers to a voltage that is greater than or boosted relative to the non-overdriven voltage. As shown in FIG. 7, pixel 22' can be supplied with an overdriven positive power supply voltage ELVDD_od on positive power supply line 400'. Overdriven power supply voltage ELVDD_od may be at least 1 V greater than ELVDD, at least 2 V greater than ELVDD, at least 3 V greater than ELVDD, at least 5% greater than ELVDD, at least 10% greater than ELVDD, at least 20% greater than ELVDD, at least 30% greater than ELVDD, or some other boosted voltage value that is greater than ELVDD. Boosting ELVDD has the effect of increasing the data voltage loaded onto pixel 22', which increases the luminance/brightness of each pixel 22'. Overdrive voltages are sometimes referred to as boosted voltages. If desired, the ground voltage ELVSS may also be overdriven (e.g., driven to an even lower or more negative value than ELVSS for pixel 22). The term "overdrive" or "overdriven," when applied to a low or negative voltage generally refers to a voltage that is less than or even more negative than the non-overdriven voltage.

As another example, the voltage levels of the scan control signals provided to pixel 22' can be tuned relative to the scan signals provided to pixel 22 to help increase the drive current for the pixels in the reduced pixel density region 332. In FIG. 6, scan signals such as SC1 may toggle between low voltage VGL and high voltage VGH. Low voltage VGL may be equal to ELVSS, greater than ELVSS, or less than ELVSS. High voltage VGH may be equal to ELVDD, greater than ELVDD, or less than ELVDD.

In FIG. 7, however, scan control signal SC1 may be configured to toggle between an overdriven low voltage VGL_od and an overdriven high voltage VGH_od. Overdrive voltage VGL_od is less than non-overdrive voltage VGL, whereas overdrive voltage VGH_od is greater than non-overdrive voltage VGH. Overdrive voltage VGH_od may be at least 1 V greater than VGH, at least 2 V greater than VGH, at least 3 V greater than VGH, at least 5% greater than VGH, at least 10% greater than VGH, at least 20% greater than VGH, at least 30% greater than VGH, or some other boosted voltage value that is greater than VGH. Conversely, overdrive voltage VGL_od may be at least 1 V less than VGL, at least 2 V less than VGL, at least 3 V less than VGL, at least 5% lower than VGL, at least 10% lower than VGL, at least 20% lower than VGL, at least 30% lower than VGL, or some other overdrive voltage value that is less than VGL. Tuning VGH_od and VGL_od impacts the amount of capacitive kickback at node Y, which can help increase the overall drive current flowing through the drive transistor during the emission phase. If desired, any of the other scan signals (e.g., SC2, SC3, and/or SC4) can be overdriven in this way.

As another example, the initialization voltage of pixel 22' can be overdriven to a lower voltage relative to the initialization voltage of pixel 22. As shown in FIG. 7, pixel 22' can be supplied with an overdriven initialization voltage Vini_od on initialization line 404'. Overdriven initialization voltage Vini_od may be at least 1 V less than the nominal Vini, at least 2 V less than Vini, at least 3 V less than Vini, at least 4 V less than Vini, at least 5% lower than Vini, at least 10% lower than Vini, at least 20% lower than Vini, at least 30% lower than Vini, or some other overdrive voltage value that is less than Vini. Providing pixel 22' with an overdriven initialization voltage Vini_od can help increase the drive current of pixel 22' during the emission phase.

As another example, the storage capacitor Cst' of pixel 22' within reduced pixel density region 332 can have a different capacitance relative to storage capacitor Cst of pixel 22 within full pixel density region 334. For instance, capacitor Cst' may be at least 10% greater than Cst, at least 20% greater than Cst, at least 30% greater than Cst, at least 40% greater than Cst, at least 50% greater than Cst, at least 60% greater than Cst, 50-100% greater than Cst, or more than double the capacitance of Cst. Providing pixel 22' with a larger storage capacitor Cst' can help increase the drive current of pixel 22' during the emission phase.

As another example, the threshold voltage of the semiconducting oxide transistors (Vth_ox') of pixel 22' within the reduced pixel density region 332 can have a different voltage level relative to the threshold voltage of the semiconducting oxide transistors (Vth_ox) of pixel 22 within the full pixel density region 334. For instance, the threshold voltage of semiconducting oxide transistors Toxide' and Tini' within pixel 22' can be at least 0.5 V less than the nominal threshold voltage (Vth_ox) of transistors Toxide and Tini within pixel 22, at least 1 V less than the nominal Vth_ox, at least 2 V less than Vth_ox, at least 5% lower than Vth_ox, at least 10% lower than Vth_ox, at least 20% lower than Vth_ox, at least 30% lower than Vth_ox, or some other voltage value that is less than Vth_ox. Providing pixel 22' with a more negative oxide transistor threshold voltage can help increase the drive current of pixel 22' during the emission phase.

As another example, the threshold voltage of the drive transistor (Vth') of pixel 22' within the reduced pixel density region 332 can have a different voltage level relative to the threshold voltage of the drive transistor (Vth) of pixel 22 within the full pixel density region 334. For instance, the threshold voltage Vth' of drive transistor Tdrive' within pixel 22' can be at least 0.5 V less than the nominal drive transistor threshold voltage (Vth) within pixel 22, at least 1 V less than the nominal Vth, at least 2 V less than Vth, at least 5% lower than Vth, at least 10% lower than Vth, at least 20% lower than Vth, at least 30% lower than Vth, or some other voltage value that is less than Vth. Providing pixel 22' with a more negative drive transistor threshold voltage can help increase the drive current of pixel 22' during the emission phase.

As another example, the subthreshold voltage swing of drive transistor Tdrive' of pixel 22' within the reduced pixel density region 332 can have a different voltage range relative to the subthreshold voltage swing of transistor Tdrive of pixel 22 within the full pixel density region 334. The subthreshold voltage swing of the drive transistor can be tuned by changing the contact hole density, annealing procedure, or other processing steps during manufacturing. For instance, the subthreshold swing of Tdrive' within pixel 22' may be at least 10% than the subthreshold swing of Tdrive within pixel 22, at least 20% than the subthreshold swing of Tdrive, at least 30% than the subthreshold swing of Tdrive, at least 40% than the subthreshold swing of Tdrive, at least 50% than the subthreshold swing of Tdrive, etc. Providing pixel 22' with a smaller subthreshold swing can help increase the drive current of pixel 22' during the emission phase.

If desired, the mobility Tdrive' and/or other transistor(s) within pixel 22' can also be tuned to increase the drive current of pixel 22' during the emission phase. In some embodiments, the contact hole density can also be tuned to reduce the drive current's sensitivity to temperature variations. If desired, the anode aperture ratio of diode 26' in pixel 22' can also be tuned to reduce the drive current's sensitivity to temperature variations (e.g., the anode aperture ratio of pixel 22' in the reduce pixel density region may be different than the aperture ratio of pixel 22 in the full pixel density region). The anode aperture ratio may be defined as the ratio of the surface area of the anode in a given pixel to the total surface area of that pixel.

The various techniques above for increasing the drive current of pixel 22' within the reduced pixel density region 332 are not mutually exclusive and can be employed in any suitable combination. These techniques can also be individually applied to subpixels for particular colors (e.g., to only green subpixels, to only red subpixels, to only blue subpixels, to subpixels of all colors, to only green and red subpixels, to only green and blue subpixels, or to only red and blue subpixels).

Figure 8:
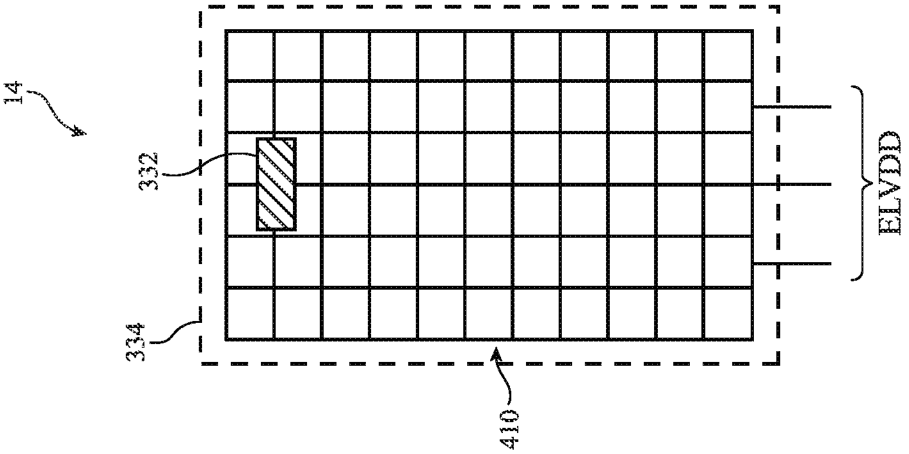
FIG. 8 is a top (plan) view of an illustrative display having a first power supply voltage (ELVDD) grid in accordance with some embodiments.

FIG. 8 is a top (plan) view of display 14 showing a power supply grid configured to provide ELVDD to pixels in the full pixel density region 334. As shown in FIG. 8, power supply grid 410 may have a mesh-like structure configured to route nominal positive power supply voltage ELVDD to pixels 22 in the full pixel density region 334. Power supply grid (or mesh) 410 may cover most of the active area of display 14. Power supply grid 410 may optionally be routed through reduced pixel density region 332 or may not traverse reduced pixel density region 332. If desired, ground power supply voltage ELVSS can also be routed throughout the display using a similar grid or mesh-like routing structure.

Figure 9:
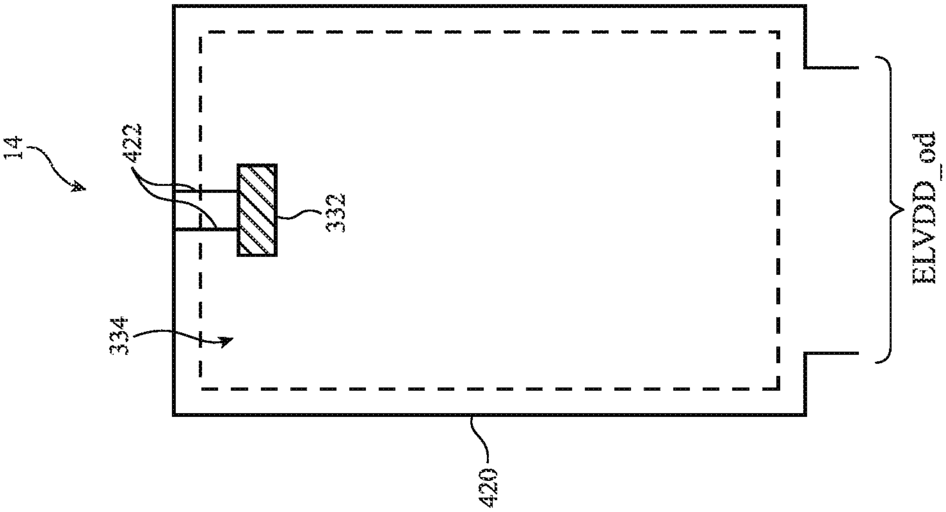
FIG. 9 is a top (plan) view of an illustrative display having border routing for conveying a second power supply voltage (ELVDD_od) to a reduced pixel density region in accordance with some embodiments.

FIG. 9 is a top (plan) view of display 14 showing a border routing path 420 for conveying overdrive power supply voltage ELVDD_od to the reduced pixel density region 332. As shown in FIG. 9, routing path 420 may be routed along the periphery of the display pixel array and may be routed towards reduce pixel density region 332 using top connection paths 422. Configured in this way, paths 420 and 422 can be used to provide ELVDD_od to pixels 22' in region 332. Although FIG. 9 is shown as a separate figure than FIG. 8, routing paths 420 and 422 can be overlaid on top of the structures of FIG. 8 in a single electronic device display. In other words, ELVDD power grid 410 and the ELVDD_od routing paths 420 and 422 can coexist on display 14. The example of FIG. 9 in which reduced pixel density region 332 is provided with ELVDD_od via a top border connection (paths 422) is merely illustrative. If desired, any number of reduced pixel density regions 332 on the display can be provided with ELVDD_od using an edge connection to border routing path 420 (e.g., from the top edge of the device, from the left edge of the device, from the right edge of the device, from left and right edges of the device, from a corner of the device, or from another location along the border of the device).

Figure 10:
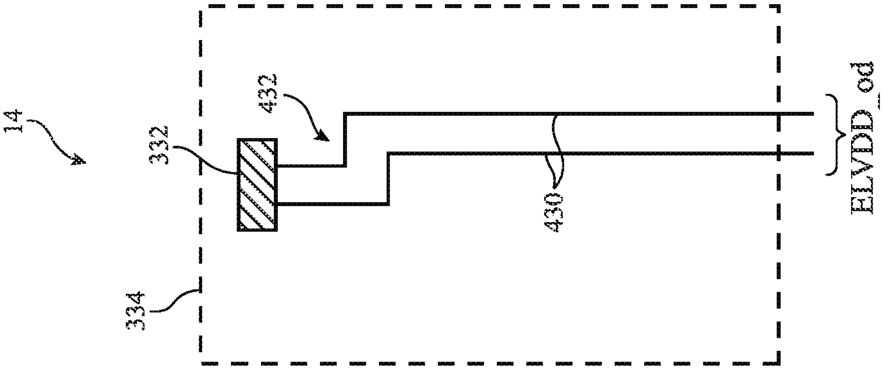
FIG. 10 is a top (plan) view of an illustrative display having routing paths traversing the active area for conveying a second power supply voltage (ELVDD_od) to a reduced pixel density region in accordance with some embodiments.

FIG. 10 is a top (plan) view of display 14 showing through-active-area routing paths 430 for conveying overdrive power supply voltage ELVDD_od to the reduced pixel density region 332. As shown in FIG. 10, routing paths 430 may be routed through the active area of the display pixel array (e.g., through portions of full pixel density region 334). Routing paths 430 may include one or more turns 432. Routing ELVDD_od through the active area can further reduce the border area. Configured in this way, paths 430 can be used to provide ELVDD_od to pixels 22' in region 332. Although FIG. 10 is shown as a separate figure than FIG. 8, routing paths 430 can be overlaid on top of the structures of FIG. 8 in a single electronic device display. In other words, ELVDD power grid 410 and the ELVDD_od routing paths 430 can coexist on display 14 using different metal routing layers. If desired, any number of reduced pixel density regions 332 on the display can be provided with ELVDD_od using a through-active-area routing path having one or more turns.

The examples of FIGS. 9 and 10 showing border routing and through-active-area routing of ELVDD_od is merely illustrative. If desired, border routing paths and through-active-area routing paths can be used to provide other global control signals to pixels 22' within the reduced pixel density region 332. In certain embodiments where drive transistor Tdrive' in pixel 22' within the reduced pixel density region 332 have a backside (body) metal conductor, the backside conductor or terminal of Tdrive' can be connected to ELVDD, to ELVDD_od, or some other separate bias voltage.

Figure 11:
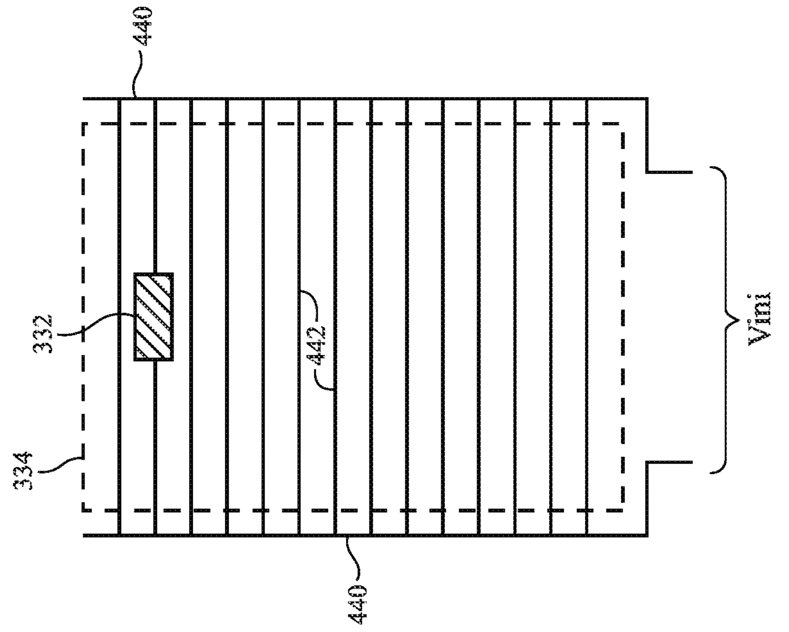
FIG. 11 is a top (plan) view of an illustrative display having a first initialization voltage (Vini) grid in accordance with some embodiments.

FIG. 11 is a top (plan) view of display 14 showing a voltage grid configured to provide initialization voltage Vini to pixels 22 in the full pixel density region 334. As shown in FIG. 11, the voltage grid may have border routing paths 440 and horizontal routing lines 442 traversing the full pixel density region 334. The Vini routing lines 442 may cover most of the active area of display 14. Routing lines 442 may optionally be routed through reduced pixel density region 332 or may not traverse reduced pixel density region 332. If desired, anode reset voltage Var or other reference voltage can also be routed throughout the display using a similar grid-like routing structure.

Figure 12:
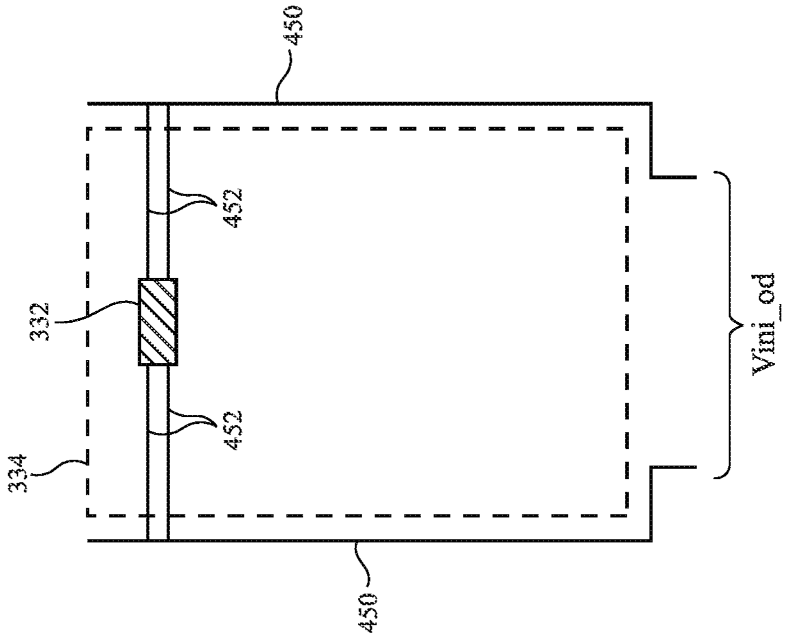
FIG. 12 is a top (plan) view of an illustrative display having edge routing for conveying a second initialization voltage (Vini_od) to a reduced pixel density region in accordance with some embodiments.

FIG. 12 is a top (plan) view of display 14 showing a border routing path 450 for conveying overdrive initialization voltage Vini_od to the reduced pixel density region 332. As shown in FIG. 12, routing path 450 may be routed along the periphery of the display pixel array and may be routed towards reduce pixel density region 332 using row connection paths 452. Configured in this way, paths 450 and 452 can be used to provide Vini_od to pixels 22' in region 332. Although FIG. 12 is shown as a separate figure than FIG. 11, routing paths 450 and 452 can be overlaid on top of the structures of FIG. 11 in a single electronic device display. In other words, the Vini voltage grid and the Vini_od routing paths 450 and 452 can coexist on display 14. The example of FIG. 12 in which reduced pixel density region 332 is provided with Vini_od via a left and right edge connection (paths 452) is merely illustrative. If desired, any number of reduced pixel density regions 332 on the display can be provided with Vini_od using an edge connection to border routing path 450 (e.g., from the top edge of the device, from the left edge of the device, from the right edge of the device, from a corner of the device, or from another location along the border of the device).

Figure 13:
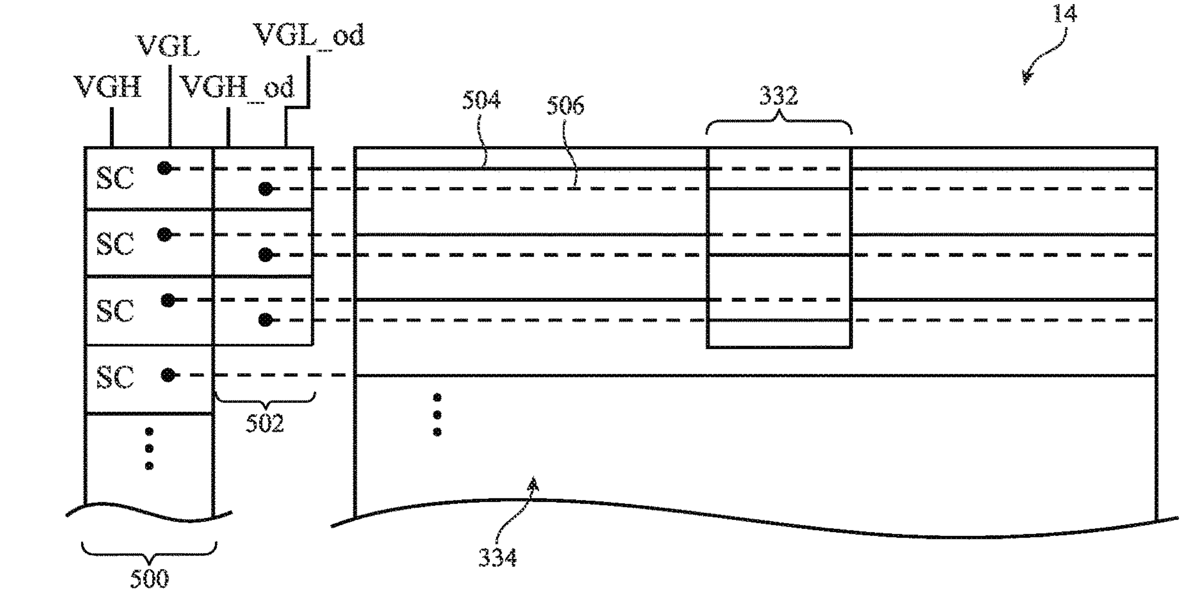
FIG. 13 is top (plan) view of an illustrative display having gate drivers and additional overdrive buffers for providing overdrive signals to a reduced pixel density region in accordance with some embodiments.

FIG. 13 is a diagram showing illustrative gate driver circuitry that can be used to provide scan control signals to respective rows of pixels in display 14. As shown in FIG. 13, each row of pixels can be driven using a plurality of scan line driver circuits 500. Scan line drivers 500 may be part of gate driver circuitry 34. Scan line drivers 500 may receive voltages VGH and VGL and may be configured to provide scan signals toggling between VGH and VGL to pixels 22 in the full pixel density region 334 via corresponding row lines 504. The gate driver circuitry may further include overdrive buffer circuits 502. Overdrive buffers 502 may receive overdrive voltages VGH_od and VGL_od and may be configured to provide scan signals toggling between VGH_od and VGL_od to pixels 22' in the reduced pixel density region 332 via corresponding row lines 506. Overdrive buffers 502 may only be included in the rows overlapping with reduced pixel density region 332 since the overdrive voltages are provided to pixels 22' in that region. Overdrive buffers 502 may be configured to drive scan signal SC1, SC2, SC3, and/or SC4.

Figure 14:
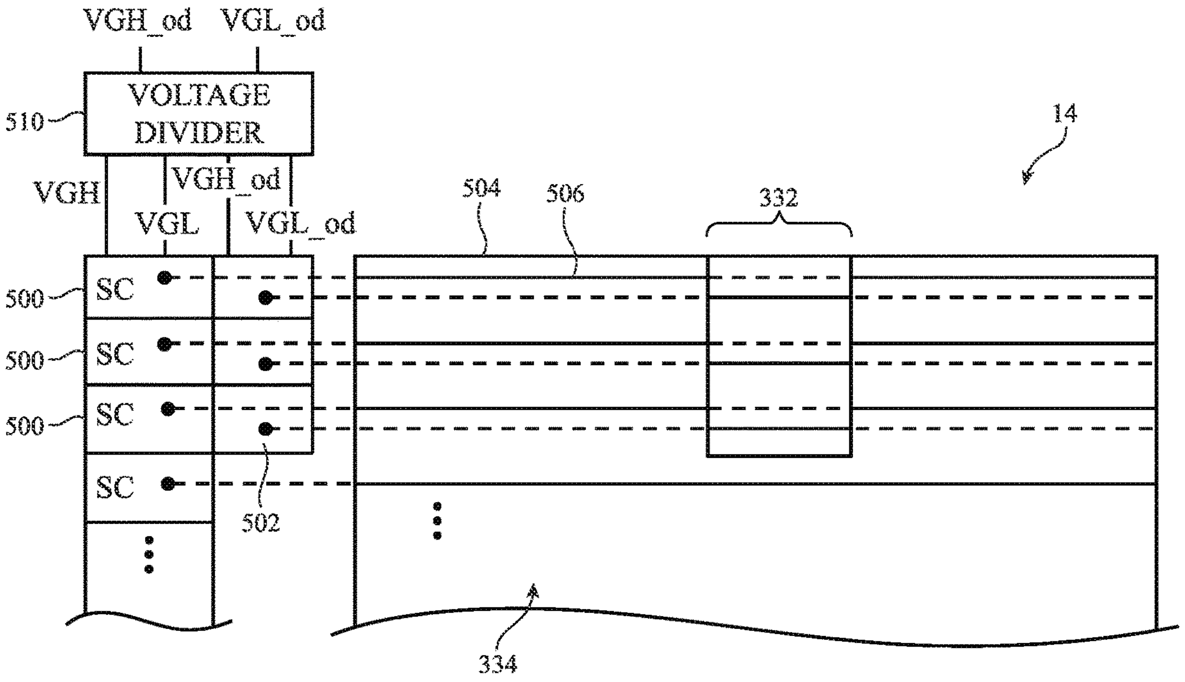
FIG. 14 is a top (plan) view of an illustrative display having gate drivers and additional overdrive buffers coupled to a power supply voltage divider in accordance with some embodiments.

The four voltages VGH, VGL, VGH_od, and VGL_od of FIG. 13 may be externally supplied. FIG. 14 shows another suitable arrangement in which display 14 is provided with a voltage divider circuit 510 configured to receive externally supplied voltages VGH_od and VGL_od and to generate corresponding lower (non-overdriven) voltages VGH and VGL. As shown in FIG. 14, the reduced voltages VGH and VGL can be generated using voltage divider 510 and conveyed to scan line drivers 500, whereas the overdriven voltages VGH_od and VGL_od are simply passed through to overdrive buffers 502. Similar to the embodiment of FIG. 13, scan line drivers 500 of FIG. 14 can be used to provide non-overdriven scan control signals to pixels 22 in the full pixel density region 334 via corresponding row lines 504, whereas overdrive buffers 502 of FIG. 14 can be used to provide overdriven scan control signals to pixels 22' in the reduced pixel density region 332 via corresponding row lines 506. In yet other suitable embodiments, a voltage divider 510 can be included in each row to provide non-overdriven scan signals toggling between VGH and VGL to the different rows in the display pixel array.

Figure 15:
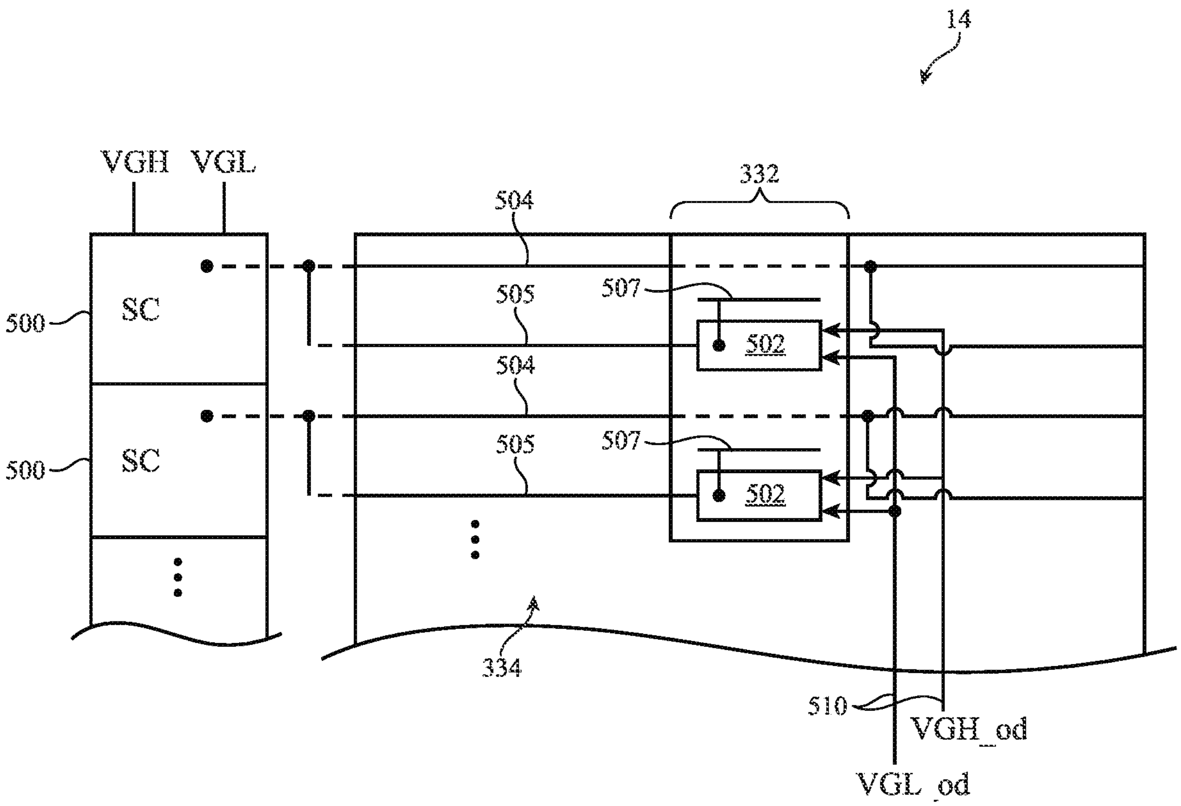
FIG. 15 is a top (plan) view of an illustrative display having peripheral gate drivers and additional overdrive buffers formed within a reduced pixel density region in accordance with some embodiments.

The embodiments of FIGS. 13 and 14 in which the overdrive buffers 502 are disposed in the border region of display 14 is merely illustrative and is not intended to limit the scope of the present embodiments. FIG. 15 shows another embodiment in which overdrive buffers 502 are formed within the reduced pixel density region 332. As shown in FIG. 15, scan line drivers 500 are formed in the periphery (border) of the active area, receive voltages VGH and VGL, and are configured to provide corresponding scan control signals toggling between VGH and VGL to a row of pixels 22 via row lines 504. Scan line drivers 500 can also provide scan signals to overdrive buffers 502 via row lines 505. The overdrive buffers 502 are formed within reduced pixel density region 332, receive control signals from gate line drivers 500 via row lines 505, and are configured to output overdrive scan control signals toggling between VGH_od and VGL_od to pixels 22' via row lines 507. The overdrive buffers 502 may receive overdrive voltages VGH_od and VGL_od via voltage lines 510 routed through the active area (e.g., through full pixel density region 334) of the display. Forming overdrive buffers 502 within the localized sensor region (332) can help reduce the overall border width.

Due to all the differences between pixel 22 in the full pixel density region 334 and pixel 22' in the reduced pixel density region 332 as described in connection with at least FIGS. 4-15, the display settings for the pixels in the two regions may need to be tuned as well. In some embodiments, the display driver circuitry (see, e.g., circuitry 30 in FIG. 2) may provide different black levels for each color for pixels in region 332 versus the pixels in region 334. FIG. 16 is an illustrative table showing how the black levels (sometimes referred to as black voltage levels Vblack) can be different for each color between the full pixel density region 334 and the reduced pixel density region 332.

As shown in FIG. 16, the red subpixels in the full pixel density region may have a first black level Vbr1, whereas the red subpixels in the reduced pixel density region can have a second black level Vbr2 that is different than Vbr1. The green subpixels in the full pixel density region may have a first black level Vbg1, whereas the green subpixels in the reduced pixel density region can have a second black level Vbg2 that is different than Vbg1. The difference in Vbg1 and Vbg2 for the green subpixels can be applied using different offset levels from Vbr1 and Vbr2, respectively. The blue subpixels in the full pixel density region may have a first black level Vbb1, whereas the blue subpixels in the reduced pixel density region can have a second black level Vbb2 that is different than Vbb1. The difference in Vbb1 and Vbb2 for the blue subpixels can also be applied using different offset levels from Vbr1 and Vbr2, respectively. In other words, display 14 can be provided with different black level settings per color channel between pixels 22 in the full pixel density region and pixels 22' in the reduced pixel density region.

The black level of a pixel may also be dependent on the anode reset voltage. Thus, in some embodiments, the anode reset voltage Var' provided to pixels in the reduced pixel density region may be different than the anode reset voltage Var that is provided to pixels in the full pixel density region. If desired, the anode reset voltage can also be tuned per color such that the black levels between the different colors and regions are more balanced (e.g., red subpixels can receive a first anode reset voltage Var1, green subpixels can receive a second anode reset voltage Var2, and blue subpixels can receive a third anode reset voltage Var3). The sets of anode reset voltages that are used to control pixels within the full pixel density region and the pixels within the reduced pixel density region can also be different.

The example of FIG. 16 showing different black voltage levels for pixels in the full pixel density region versus the pixels in the reduced pixel density region is merely illustrative. If desired, the display driver circuitry can also be configured to provide different gamma settings for pixels in the full pixel density region versus the pixels in the reduced pixel density region. For example, pixels 22 in the full pixel density region may be driven using a first set of gamma settings, whereas pixels 22' in the reduced pixel density region may be driven using a second set of gamma settings different than the first set of gamma settings to ensure the black levels are more balanced. In some embodiments, pixels 22 in the full pixel density region and pixels 22' in the reduced pixel density region can be adjusted physically (e.g., by configuring the subpixels with different sizes, shapes, and/or orientations) to match luminance color, as well as to mitigate differences in temperature and aging impact.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a sensor; and a display having at least a first pixel formed in a reduced pixel density region overlapping with the sensor and having at least a second pixel formed in a full pixel density region at least partially surrounding the reduced pixel density region, wherein the reduced pixel density region has a first pixel density, the full pixel density region has a second pixel density greater than the first pixel density, the first pixel formed in the reduced pixel density region is configured to receive a first positive power supply voltage, the second pixel formed in the full pixel density region is configured to receive a second positive power supply voltage different than the first positive power supply voltage, and the display further comprises:

a power supply grid configured to convey the second positive power supply voltage to a plurality of pixels, including the second pixel, in the full pixel density region; and a conductive path routed along a periphery the display or through the full pixel density region and configured to convey the first positive power supply voltage to a plurality of pixels, including the first pixel, in the reduced pixel density region.

2. The electronic device of claim 1, wherein the first positive power supply voltage provided to the first pixel in the reduced pixel density region is greater than the second positive power supply voltage provided to the second pixel in the full pixel density region.

3. The electronic device of claim 1, wherein:

the first pixel formed in the reduced pixel density region comprises a first semiconducting oxide transistor configured to receive a first scan signal that toggles between a first high voltage and a first low voltage; and the second pixel formed in the full pixel density region comprises a second semiconducting oxide transistor configured to receive a second scan signal that toggles between a second high voltage less than the first high voltage and a second low voltage greater than the first low voltage.

4. The electronic device of claim 1, wherein:

the first pixel formed in the reduced pixel density region comprises a first semiconducting oxide transistor configured to receive a first scan signal that toggles between a first high voltage and a first low voltage; and the second pixel formed in the full pixel density region comprises a second semiconducting oxide transistor configured to receive a second scan signal that toggles between a second high voltage less than the first high voltage and a second low voltage greater than the first low voltage.

5. The electronic device of claim 1, wherein:

the first pixel formed in the reduced pixel density region comprises a first initialization transistor configured to receive a first initialization voltage; and the second pixel formed in the full pixel density region comprises a second initialization transistor configured to receive a second initialization voltage greater than the first initialization voltage.

6. The electronic device of claim 1, wherein:

the first pixel formed in the reduced pixel density region comprises a first storage capacitor; and the second pixel formed in the full pixel density region comprises a second storage capacitor having a smaller capacitance than the first storage capacitor.

7. The electronic device of claim 1, wherein:

the first pixel formed in the reduced pixel density region comprises a first semiconductor oxide transistor having a first threshold voltage; and the second pixel formed in the full pixel density region comprises a second semiconductor oxide transistor having a second threshold voltage different than the first threshold voltage.

8. The electronic device of claim 1, wherein:

the first pixel formed in the reduced pixel density region comprises a first drive transistor having a first threshold voltage; and the second pixel formed in the full pixel density region comprises a second drive transistor having a second threshold voltage different than the first threshold voltage.

9. The electronic device of claim 1, wherein:

the first pixel formed in the reduced pixel density region comprises a first drive transistor having a first subthreshold swing; and the second pixel formed in the full pixel density region comprises a second drive transistor having a second subthreshold swing different than the first subthreshold swing.

10. The electronic device of claim 1, wherein:

the first pixel formed in the reduced pixel density region comprises a first drive transistor having a first contact density; and the second pixel formed in the full pixel density region comprises a second drive transistor having a second contact density different than the first contact density.

11. The electronic device of claim 1, wherein:

the first pixel formed in the reduced pixel density region comprises a first light-emitting diode having a first anode aperture ratio; and the second pixel formed in the full pixel density region comprises a second light-emitting diode having a second anode aperture ratio different than the first anode aperture ratio.

12. The electronic device of claim 1, wherein:

the first pixel formed in the reduced pixel density region comprises a first anode reset transistor configured to receive a first anode reset voltage; and the second pixel formed in the full pixel density region comprises a second anode reset transistor configured to receive a second anode reset voltage different than the first anode reset voltage.

13. The electronic device of claim 1, wherein:

the first pixel formed in the reduced pixel density region is controlled using a first set of black level settings; and the second pixel formed in the full pixel density region is controlled using a second set of black level settings different than the first set of black level settings.

14. The electronic device of claim 1, wherein:

the first pixel formed in the reduced pixel density region includes first subpixels having first sizes; and the second pixel formed in the full pixel density region includes second subpixels having second sizes smaller than the first sizes, wherein the first and second sizes are configured so that a pixel current density of the first pixel is matched with a pixel current density of the second pixel.

15. An electronic device comprising:

a sensor; and display circuitry that includes at least a first pixel formed in a reduced pixel density region overlapping with the sensor, at least a second pixel formed in a full pixel density region at least partially surrounding the reduced pixel density region, a gate driver circuit configured to generate a scan signal for the second pixel in the full pixel density region, the scan signal toggling between a first high voltage and a first low voltage, and an overdrive buffer circuit configured to generate an overdrive scan signal for the first pixel in the reduced pixel density region, the overdrive scan signal toggling between a second high voltage greater than the first high voltage and a second low voltage less than the first low voltage.

16. The electronic device of claim 15, the display circuitry further comprising:

a voltage divider configured to receive the second high voltage and the second low voltage and to generate the first high voltage and the first low voltage based on the second high voltage and the second low voltage.

17. The electronic device of claim 15, wherein the gate driver circuit and the overdrive buffer circuit are formed in a border region of the display circuitry.

18. The electronic device of claim 15, wherein the gate driver circuit is formed in a border region of the display circuitry and wherein the overdrive buffer circuit is formed within the reduced pixel density region.

19. An electronic device comprising:

a sensor; and a display having at least a first pixel formed in a reduced pixel density region overlapping with the sensor and having at least a second pixel formed in a full pixel density region at least partially surrounding the reduced pixel density region, wherein the reduced pixel density region has a first pixel density, the full pixel density region has a second pixel density greater than the first pixel density, the first pixel formed in the reduced pixel density region is controlled using a first set of black level settings, and the second pixel formed in the reduced pixel density region is controlled using a second set of black level settings different than the first set of black level settings.

20. The electronic device of claim 19, wherein:

the first set of black level settings comprises a first black voltage level for controlling a red subpixel in the first pixel, a second black voltage level for controlling a green subpixel in the first pixel, and a third black voltage level for controlling a blue subpixel in the first pixel; and the second set of black level settings comprises a fourth black voltage level, different than the first black voltage level, for controlling a red subpixel in the second pixel, a fifth black voltage level, different than the second black voltage level, for controlling a green subpixel in the second pixel, and a sixth black voltage level, different than the third black voltage level, for controlling a blue subpixel in the second pixel.

21. The electronic device of claim 19, wherein:

the first pixel formed in the reduced pixel density region is controlled using first gamma settings, and the second pixel formed in the reduced pixel density region is controlled using second gamma settings different than the first gamma settings.

22. The electronic device of claim 19, wherein:

the first pixel formed in the reduced pixel density region comprises a first drive transistor having a first contact density; and the second pixel formed in the full pixel density region comprises a second drive transistor having a second contact density different than the first contact density.

23. The electronic device of claim 19, wherein:

the first pixel formed in the reduced pixel density region comprises a first light-emitting diode having a first anode aperture ratio; and the second pixel formed in the full pixel density region comprises a second light-emitting diode having a second anode aperture ratio different than the first anode aperture ratio.

24. The electronic device of claim 19, wherein:

the first pixel formed in the reduced pixel density region comprises a first anode reset transistor configured to receive a first anode reset voltage; and the second pixel formed in the full pixel density region comprises a second anode reset transistor configured to receive a second anode reset voltage different than the first anode reset voltage.

25. The electronic device of claim 19, wherein:

the first pixel is controlled using a first set of anode reset voltages including a first anode reset voltage for resetting a red subpixel in the first pixel, a second anode reset voltage for resetting a green subpixel in the first pixel, and a third anode reset voltage for controlling a blue subpixel in the first pixel; and the second pixel is controlled using a second set of anode reset voltages including a fourth anode reset voltage, different than the first anode reset voltage, for resetting a red subpixel in the second pixel, a fifth anode reset voltage, different than the second anode reset voltage, for resetting a green subpixel in the second pixel, and a sixth anode reset voltage, different than the third anode reset voltage, for controlling a blue subpixel in the second pixel.

* * * * *